United States Patent [19]
Ogawa

[11] Patent Number: 5,438,661
[45] Date of Patent: Aug. 1, 1995

[54] VERSION MANAGEMENT METHOD AND APPARATUS IN MULTI-WINDOW ENVIRONMENT

[75] Inventor: Tomoya Ogawa, Kawasaki, Japan

[73] Assignee: Fujitsu Limited, Kawasaki, Japan

[21] Appl. No.: 312,051

[22] Filed: Sep. 23, 1994

Related U.S. Application Data

[63] Continuation of Ser. No. 791,307, Nov. 14, 1991, abandoned.

[30] Foreign Application Priority Data

Nov. 16, 1990 [JP] Japan .................. 2-311093

[51] Int. Cl.⁶ .............................. G06F 3/14
[52] U.S. Cl. .................. 395/157; 395/160; 395/155
[58] Field of Search ............... 395/157, 160, 155, 161, 395/159, 158, 156; 345/119, 120

[56] References Cited

U.S. PATENT DOCUMENTS

| | | | |
|---|---|---|---|
| 4,982,344 | 1/1991 | Jordan | 395/157 |
| 5,008,853 | 4/1991 | Bly et al. | 395/157 X |
| 5,072,412 | 12/1991 | Henderson, Jr. et al. | 395/159 |
| 5,159,669 | 10/1992 | Trigg et al. | 395/159 |
| 5,226,117 | 7/1993 | Miklos | 395/157 |
| 5,237,654 | 8/1993 | Shackelford et al. | 395/160 |
| 5,297,249 | 3/1994 | Bernstein et al. | 395/156 |
| 5,325,478 | 6/1994 | Shelton et al. | 395/155 X |
| 5,388,196 | 2/1995 | Pajak et al. | 395/161 X |

FOREIGN PATENT DOCUMENTS 2-240772  9/1990  Japan .

OTHER PUBLICATIONS

Microsoft Windows Version 3.0 User's Guide, Microsoft Corporation, 1990, pp. 49–55; 64–66.

*Primary Examiner*—Raymond J. Bayerl
*Attorney, Agent, or Firm*—Staas & Halsey

[57] ABSTRACT

The contents of a plurality of versions of a data file are displayed in respective windows on a display screen. Identifiers of parent windows, from which the windows are derived, and differential operation histories of the windows are stored in an operation history management table. The contents of the operation history management table are automatically renewed when a new window for a new version is generated and when the version of the data file is edited in a corresponding window. With this construction, comparison as well as reference between versions on the same display screen is possible.

28 Claims, 15 Drawing Sheets

| W | Wp | DIFFERENCE |
|---|----|------------|
| W1 | — | — |
| W2 | W1 | NULL |
| W3 | W1 | NULL |

| W | Wp | DIFFERENCE |
|---|----|-----------|
| W1 | — | — |
| W2 | W1 | add ○<br>add △<br>add □ |
| W3 | W1 | add ○<br>add △ |
| W4 | W3 | add □ |
| W5 | W3 | add □ |
| W6 | W2 | add □ |

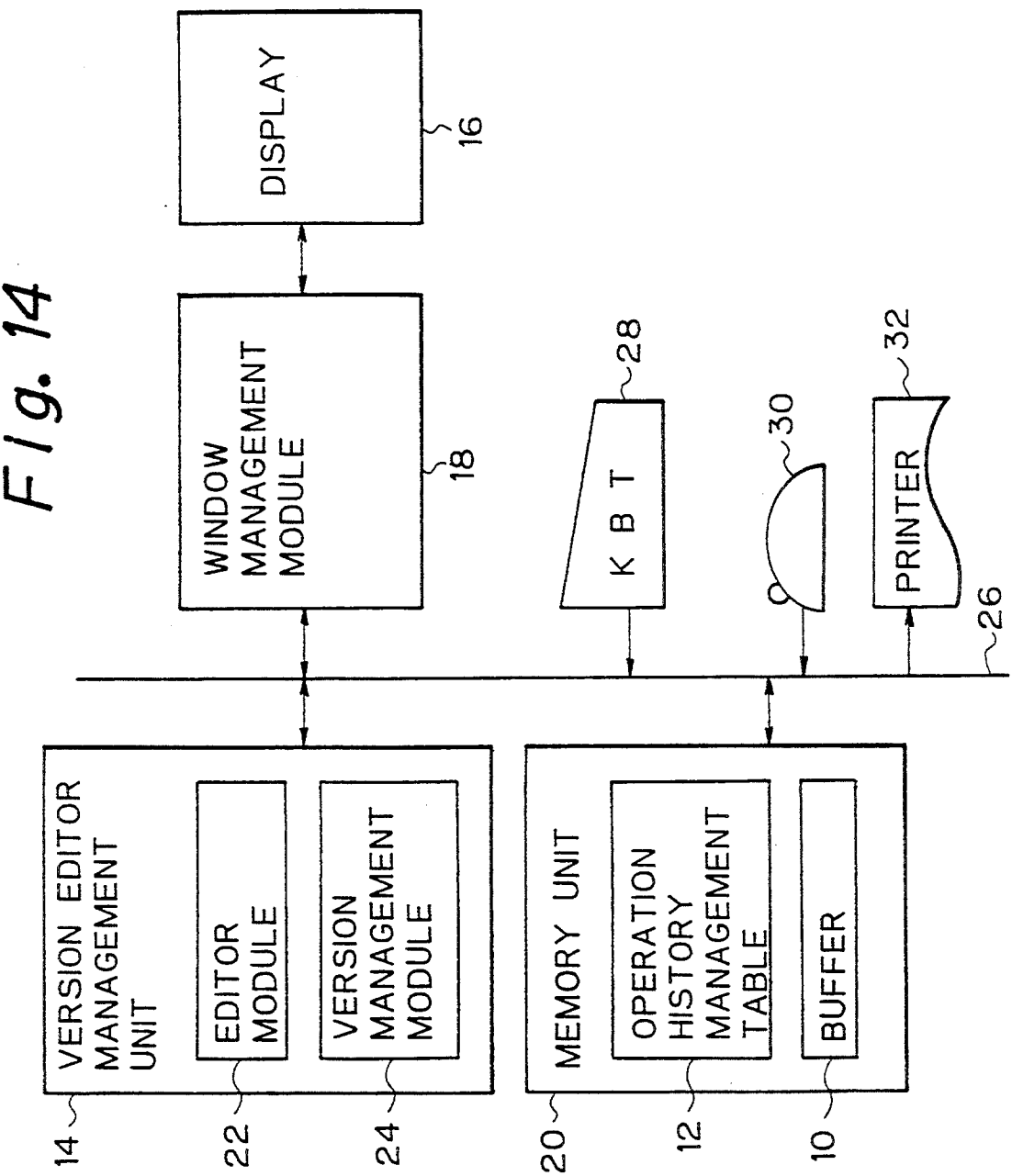

VERSION MANAGEMENT METHOD AND APPARATUS IN MULTI-WINDOW ENVIRONMENT

This application is a continuation of application Ser. No. 07/791 307, filed Nov. 14, 1991, now abandoned.

BACKGROUND OF THE INVENTION

1. Field of the Invention.

The present invention relates to a method and apparatus for version management for performing an editing process of a plurality of versions in a multi-window environment.

2. Description of the Related Art

At the present time, there are requirements for tools for improving efficiency of development and for user interfaces which are easy to use. To answer such requirements, tools for managing versions and editors operable on multi-window environments have been provided.

The editing process using editors is often performed in a manner to initially generate a fundamental version and to subsequently derive versions with modification, addition and/or deletion of the content of the basic version. On the other hand, in the multi-window environment, a plurality of mutually distinct files are assigned to respective windows for displaying the contents thereof on a display screen simultaneously. This facilitates comparison and/or reference of the contents in the files.

Accordingly, it is desired to assign the windows in the multi-window environment to a plurality of versions generated from time to time and to display them simultaneously for facilitating comparison and for improving efficiency of the editing process when the editing process is performed using an editor operable in the multi-window environment.

However, the conventional version managing tools are not established by taking into consideration the convenience of use of the multi-window environment and thus assigns the same window for all versions as long as the file is the same. Therefore, for enabling simultaneous display on the different windows, it becomes necessary to use different file names for different versions and then assign different windows. Even when displaying the mutually distinct versions by using the different file names, data concerning the dependency and difference between the versions could be lost. This makes comparison between the versions difficult and requires complicated command inputs for performing a comparison.

SUMMARY OF THE INVENTION

It is an object of the present invention to provide a method and an apparatus for version management which enables editing of a plurality of mutually distinct versions in a multi-window environment wherein comparison and reference on the same display screen is facilitated.

Another object of the invention is to provide a method and an apparatus for version management that can reduce the buffer area required for the editing process.

A further object of the present invention is to provide a method and an apparatus for version management which does not require the same editing operation and can easily edit new versions.

In accordance with the present invention, there is provided a version management method for performing management of a plurality of versions of a data file in a multi-window environment, comprising the steps of:

displaying the contents of the versions of the data file in respective windows on a display screen; the windows including a basic window for a major version and a window derived from the basic window or another derived window for a minor version, the derived window having its parent window from which the window is derived;

retaining an identifier of the parent window and a differential operation history from the parent window with regard to the respective derived window in an operation history management table, the differential operation history representing contents of a version corresponding to the derived window different from that of the parent window, and automatically renewing the corresponding contents of the operation history management table when a new window for a new version is created as a derivative of one of the windows on the display screen by the user, and when the user's editing operation is done in one of the windows, modifying the contents of the corresponding version.

In accordance with the present invention, there is also provided a version management apparatus for performing management of a plurality of versions of a data file in a multi-window environment, the apparatus including a display for contents of the versions of the data file in respective windows on a display screen; the windows including a basic window for a major version and a window derived from the basic window or another derived window for a minor version, and the derived window having its parent window from which the window is derived. The version management apparatus includes an operation history management table for retaining an identifier of the parent window and a differential operation history from the parent window with regard to the respective derived window, the differential operation history representing a contents of a version corresponding to the derived window different from that of the parent window. The version management apparatus further includes a unit and means for automatically renewing the corresponding contents of the operation history management table when a new window for a new version is created as a derivative of one of the windows on the display screen by the user, and when the user's editing operation is done in one of the windows, modifying the contents of the corresponding version.

BRIEF DESCRIPTION OF THE DRAWINGS

FIG. 14 is a block diagram of the second embodiment of a version management apparatus according to the present invention;

DESCRIPTION OF THE PREFERRED EMBODIMENTS

Figure 1:
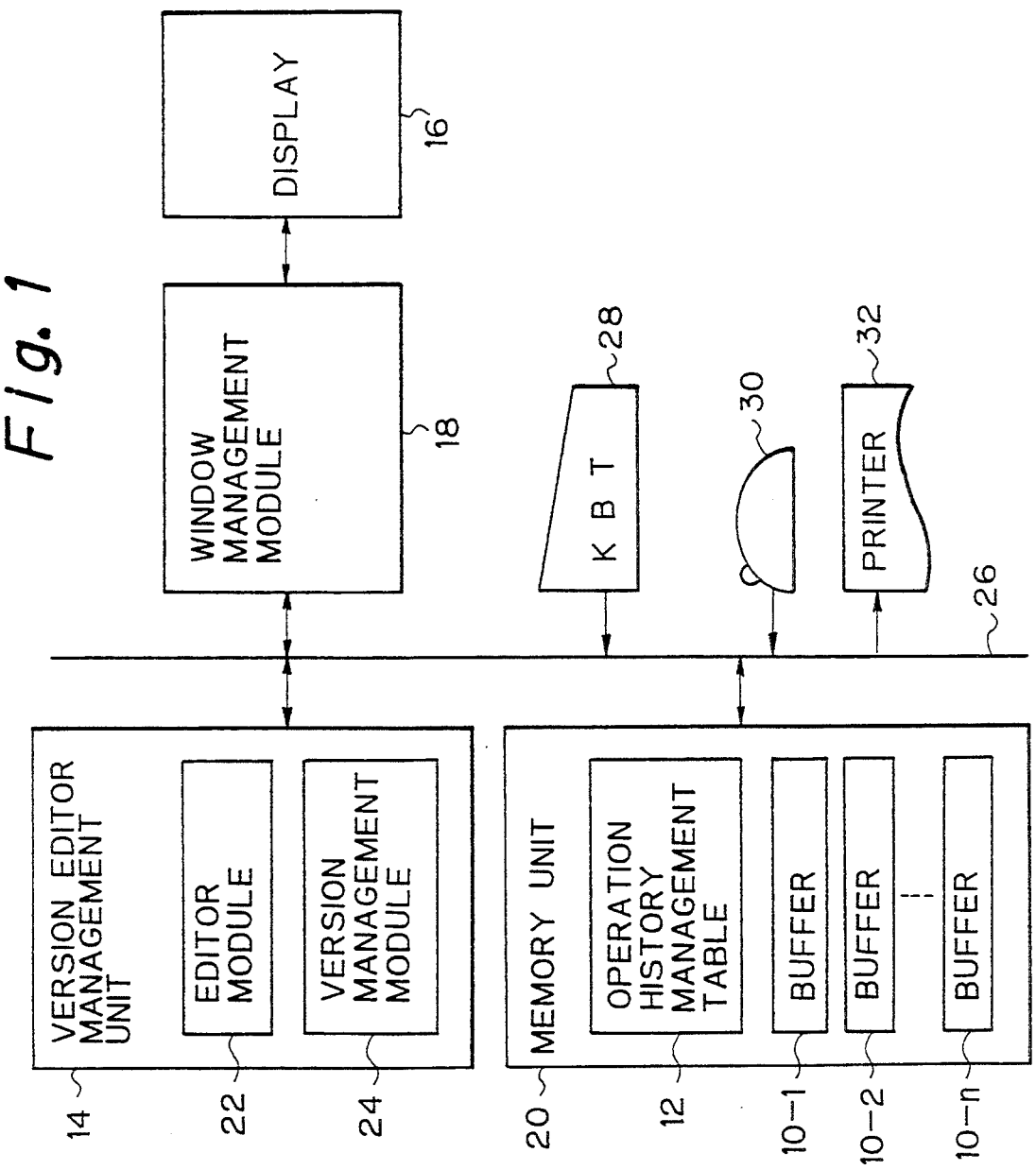
FIG. 1 is a block diagram, showing the construction of the first embodiment of the version management apparatus acceding to the present invention.

FIG. 1 shows a first embodiment of a version management apparatus according to the present invention.

In FIG. 1, the reference numeral 14 denotes a version editor management unit implemented by a computer system including a CPU. The version editor management unit 14 includes an editor module 22 and a version management module 24. The reference numeral 20 denotes a memory unit in which are stored editing buffers 10-1 to 10-n and an operation history management table 12. In the first embodiment, the buffers 10-1 to 10-n are provided with respect to a plurality of windows W1 to Wn corresponding to a plurality of versions. In an operation history management table 12, the identification of a parent window and a differential operation history with respect to the parent window, as identification parameters (addresses) for the windows W1 to Wn for respective versions, is shown. The registration for the operation history management table 12 is performed for registration and updating upon generation of a window and upon an editing process of the window.

The memory unit 20 is connected to the version editor management unit 14 via an internal bus 26. The memory unit 20 is also connected to a window management module 18 that opens the window and controls a display on a display 16 through the internal bus 26. The window management module 18 has a function as a window management means. Furthermore, to the internal bus 26, a keyboard 28 and a mouse 30 for interaction of the operator are connected. A printer 32 is also connected.

The version editor management unit 14 comprising the editing module 22 and the version management module 24, performs generation of a window when a new version is created, editing of the contents of the window, selection of the new version among the already created versions, and effective processing of editing of the contents of the window for the new version using the differential operation history between already created windows upon generation of the window. The process performed by the version editor management unit 14 will be discussed below with reference to FIGS. 2, 3, 4, 5 and 7.

Figure 2:
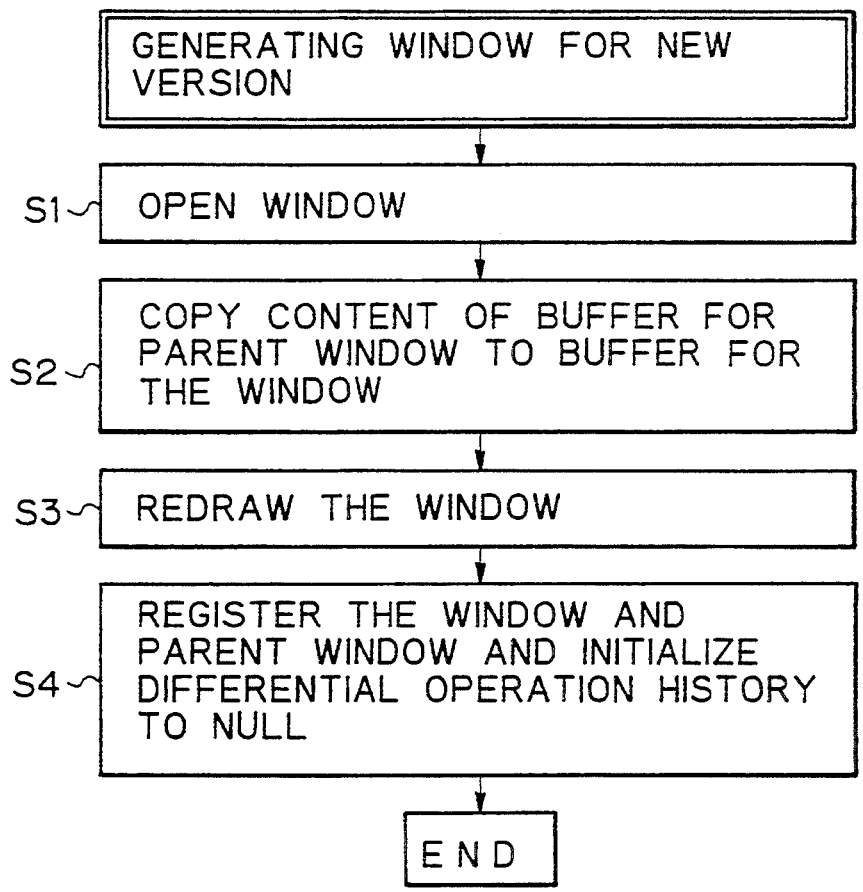
FIG. 2 is a flowchart showing a process of generating a window in the first embodiment.

In FIG. 2, at a step S1, the window is opened on the display 16. Practically, according to a command of the operator, the version editor management unit 14 commands the opening of a window to the window management module 18. Under control of the window management module 18, the window is opened on the display 16, as shown in FIG. 8A, for example.

Figure 8A:
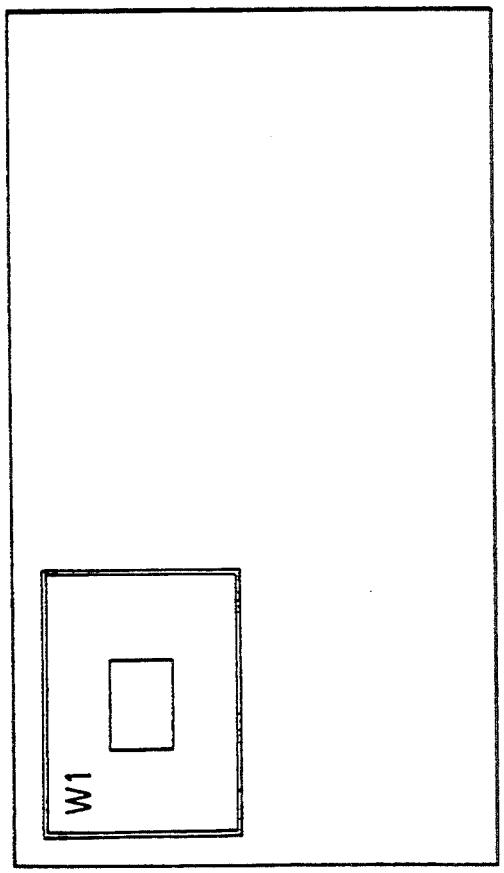
Figures 9A, 9B:
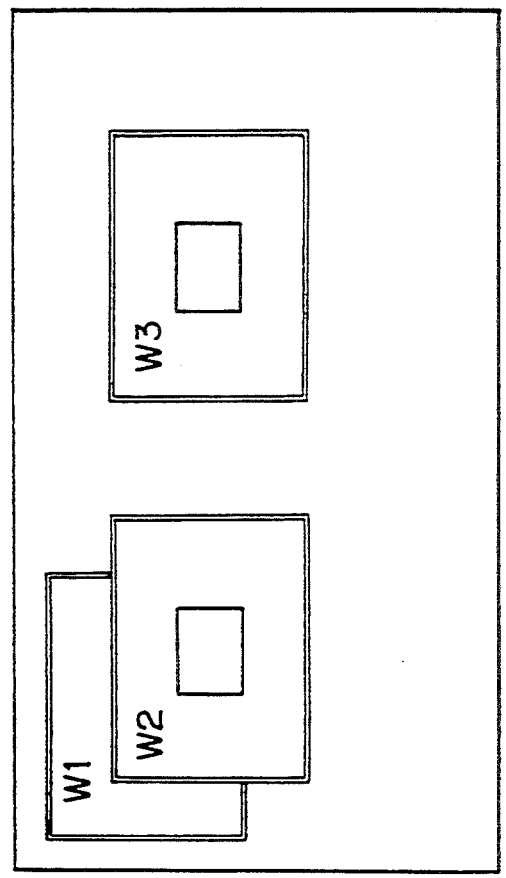
FIGS. 9A and 9B are explanatory illustrations showing the manner of generation of the second and subsequent windows.

Subsequently, at a step S2, the content of the buffer of the parent window is copied to the buffer of the window to be created. In the case of FIG. 8A, since the window W1 is the first window, copying of the buffer content of the parent window will not be performed. In contrast to this, as shown in FIG. 9A, when the window W2 derived from the window W1 is to be created as shown in FIG. 9A, the content of the buffer 10-1 of the parent window is copied to the buffer 10-2 of the window W2. Also, in case of FIG. 9A, since another window W3 is derived from the parent window W1, the content of the buffer 10-1 of the parent window W1 is similarly copied to the buffer 10-3 of the window W3.

Then, the process is advanced to a step S3, the windows are redrawn. For the example of FIG. 9A, with respect to the window W2, the content of the buffer 10-2 of the window W2, which is copied from the buffer 10-1 of the parent window through the process of the step S2, is read out and redrawn in the window W2 on the display 16. This process is similar with respect to the window W3 of FIG. 9A. Subsequently, at a step S4, in the operation history management table 12, the parent window of the newly created window is registered. The differential operation history of the newly created window in relation to the parent window is initialized to be NULL (no content).

Figure 8B:
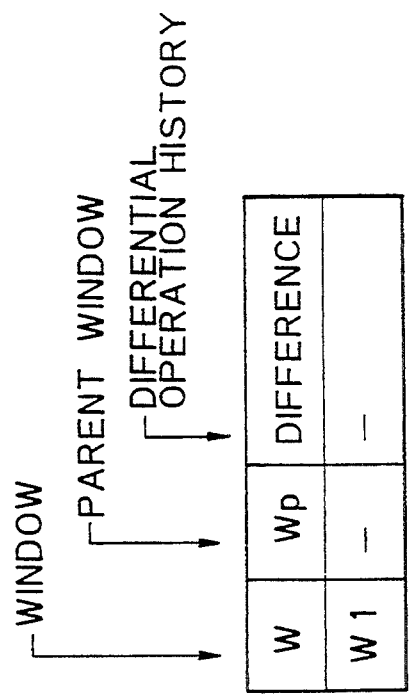

The process of registration for the operation history management table 12 in step S4 is practically shown in FIGS. 8B and 9B. In case of FIG. 8B, since the window W1 is the first window, the W1 is registered in the operation history management table 12 but the parent window and the differential operation history become empty because of no presence thereof. In contrast thereto, as shown in FIG. 9B, at generation of the window W2, the parent window W1 is registered in a parent window storage area of the window W2 in the operation history management table 12. At this time, since there is no difference with the parent window, NULL representative of no content is registered as the initial data for initialization. In a similar manner, the parent window W1 is registered for the parent window storage area of the window W3 in the operation history management table 12, and NULL is registered as the initial data.

Figure 3:
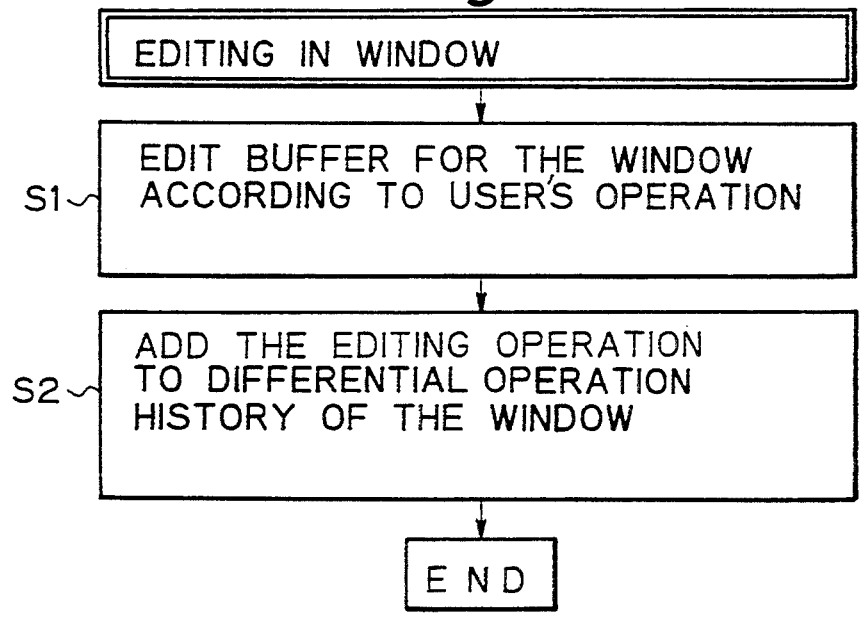
FIG. 3 is a flowchart showing a editing process in the first embodiment.

FIG. 3 is a flowchart of the edit process on the window after generation of the window through the process of FIG. 2.

In FIG. 3, it is assumed that the operator commands editing of the window W2 in the condition where the windows W1, W2 and W3 are displayed in multi-window layout, and performs the edit process by adding ○, Δ, and □. When such editing process is performed on the display 16, the content of the buffer 10-2 of the window W2 is edited according to the command of the user, namely the editing operation, at a step S1 of FIG. 3.

Figures 10A, 10B:
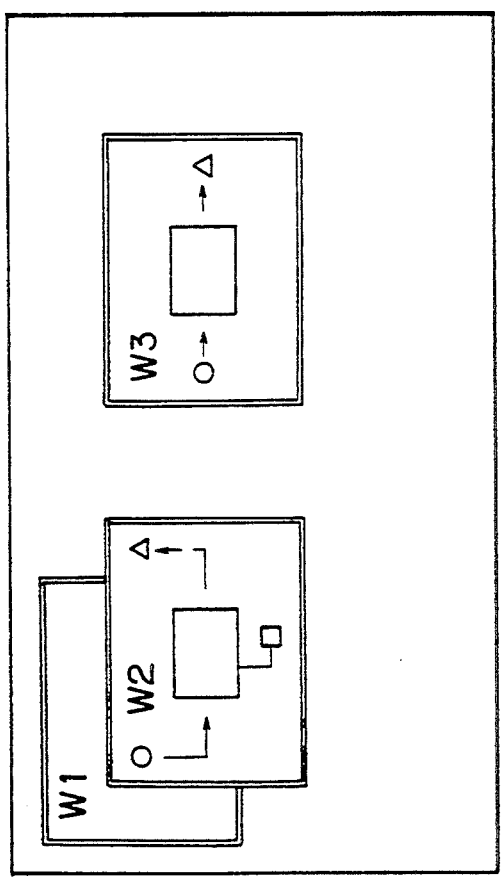
FIGS. 10A and 10B are explanatory illustrations showing the editing manner of the windows FIGS. 11A and 11B explanatory illustrations showing the manner of generation of other windows in the present invention.

Subsequently, the process is advanced to a step S2, with respect to the window W2 which is the subject of editing process, data representing the editing operation performed at the step S1 is added for the differential operation history in the operation history management table 12. For example, in case of the window W2 in FIG. 10A, the differential operation history of addition of ○, Δ and □ through the editing operation is added to the differential operation history of the window W2 in a manner shown in FIG. 10B. FIGS. 10A and 10B also show the editing operation for the window W3. As shown in FIG. 10A, in the editing operation for the window W3, ○ and Δ are added. Accordingly, for the differential operation history of the window W3, the editing operation for the addition of ○ and Δ is added.

Figure 4:
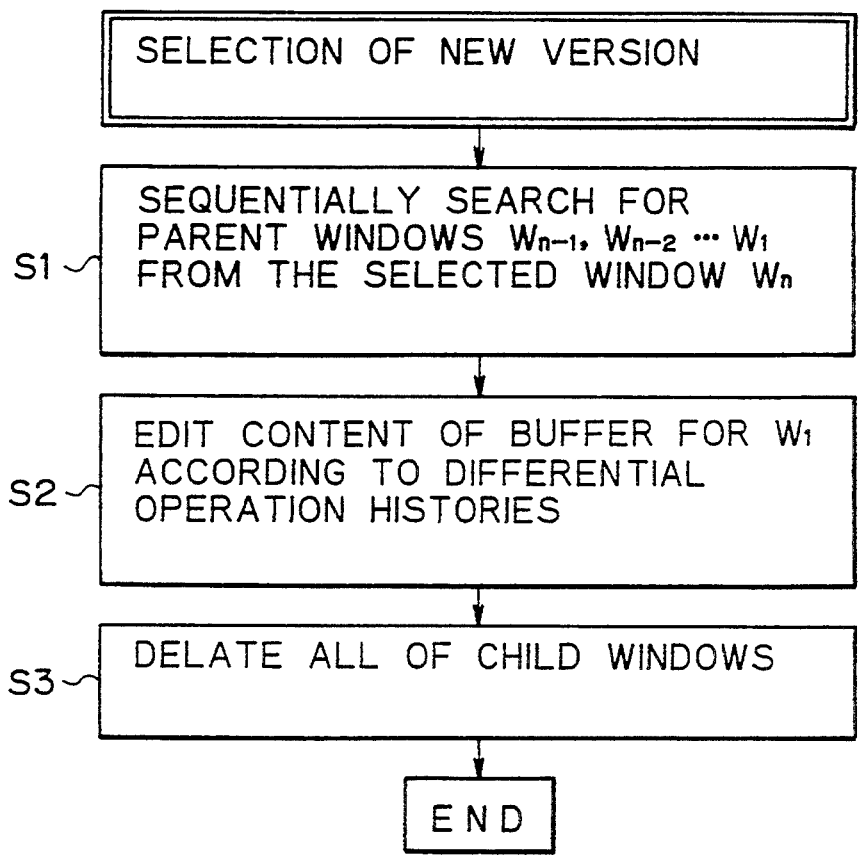
FIG. 4 is a flowchart showing a process of selection of a new version in the first embodiment.
Figure 6:
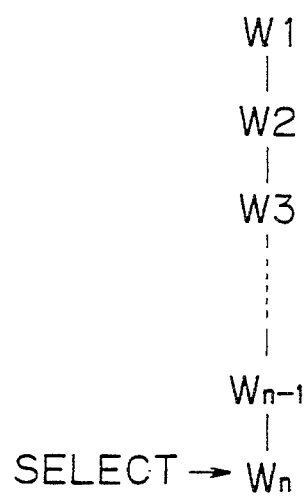
FIG. 6 is an illustration showing a series of windows on which the processes of FIG. 4 or 5 are performed.

FIG. 4 shows a flowchart for selection of one of the windows as a new major version among the windows of minor versions derived from the window of the major version through the window generation process and editing process of FIGS. 2 and 3. Here, as an example of a window group as a subject to select a new major version, one sequence of the derived window groups W1 to Wn derived from the parent window W1, as shown in FIG. 6, is taken, and the window Wn is assumed to be selected as a new major version.

At a step S1 of FIG. 4, using the operation history management table 12, a sequence of parent windows Wn-1, ... W2, W1 is obtained in order, with respect to the window Wn selected from the window group.

Then, the process is advanced to a step S2, the content of the buffer 10-1 of the window W1 as an ancestor window is edited with the differential history of the descendant windows W2, W3 ... Wn. Through this editing process at the step S2, the content of the buffer 10-1 of the window W1 is replaced with the content of the buffer 10-n of the window Wn. Thereafter, finally, at a step S3, the contents of the operation history management table 12 and the contents of the corresponding buffers 10-2 to 10-n are erased to complete the sequence of the process for selecting a new version.

The practical process of selection of the new version in FIG. 4 will be discussed with reference to FIGS. 11A and 11B.

Figures 11A, 11B:
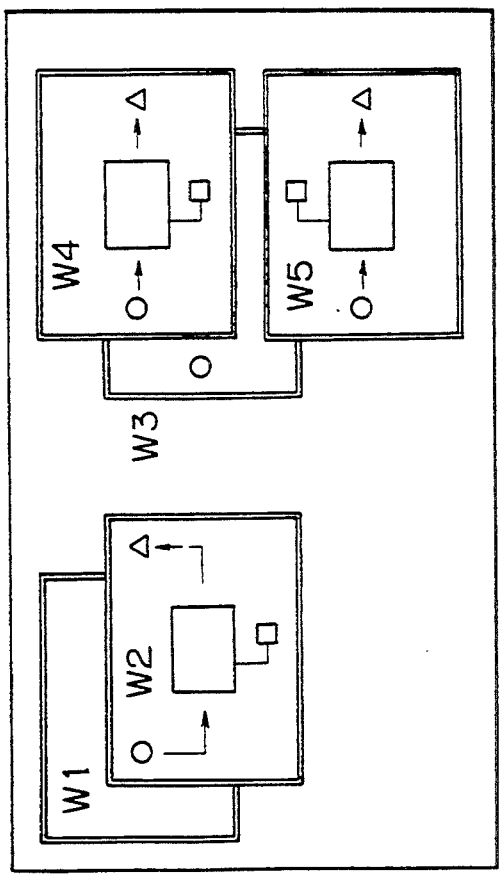
Figures 12A, 12B:
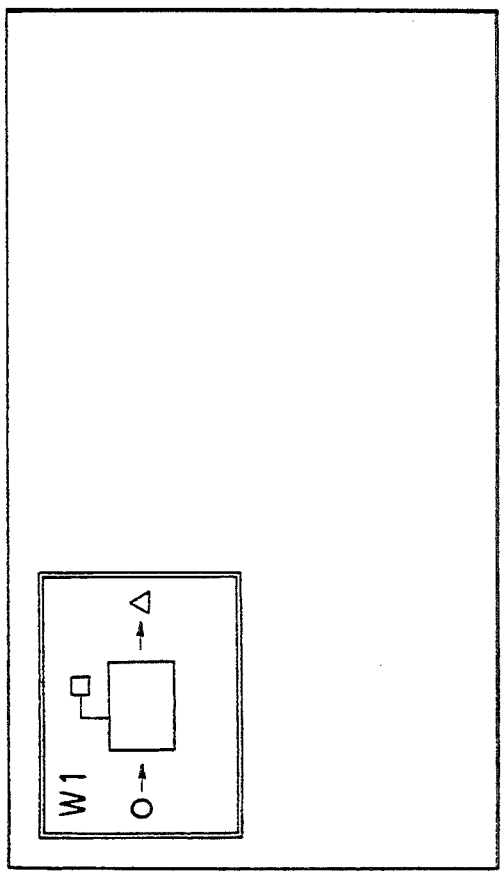
FIGS. 12A and 12B re explanatory illustrations showing the manner of selection of a version in the present invention.

FIGS. 11A and 11B show the condition in which other windows W4 and W5 are derived with respect to the window W3 of FIGS. 10A and 10B. With respect to these windows W1 to W5, it is assumed that the window W5 is selected as a new major version. In response to selection of the window W5 as the new major version, at the step S1 of FIG. 4, the sequence of the parent windows, i.e. W3 and W1 is obtained using the operation history management table 12. Thereafter, at the step S2, according to the differential operation history of the window W3, the content of the buffer 10-1 of the window W1 is modified by adding ○ and Δ. Subsequently, according to the differential operation history of the window W5, an editing process for adding □ for the content of the buffer 10-1 of the window W1 is performed. As a result, the content of the buffer 10-1 of the window W1 can be updated to that of the window W5 of FIG. 11A. Thereafter, the content of the operation history table 12 and the contents of the buffers 10-2 to 10-5 of the child windows W2 to W5 are erased. Therefore, the window W1 having the content of the selected window W5 remains as a new version. At the end of the new version selecting process set forth above, the display 16 becomes the condition as illustrated in FIG. 12A. At this time, the operation history table 12 contains only registration for the window W1 as illustrated in FIG. 12B.

Figure 5:
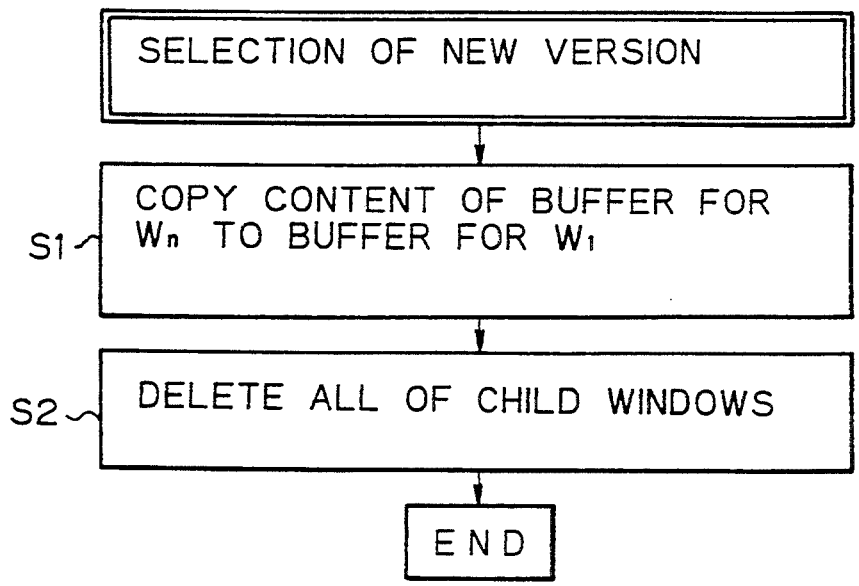
FIG. 5 is a flowchart showing another process of selection of a new version in the first embodiment.

In the first embodiment of the present invention, the buffers 10-1 to 10-n are provided for respective windows. Accordingly, instead of performing the process of the steps S1 and S2 of FIG. 4, the similar results can be obtained by simply copying the content of the window Wn to the window W1. FIG. 5 is a flowchart showing the process of selection of a new version through this method.

In FIG. 5, at a step S1, the content of the buffer 10-n of the window Wn as the selected window for the new version is copied to the buffer 10-1 of the parent window W1. Subsequently, at a step S2, the operation history management table 12 of all child windows W2 to Wn and the content of the buffers 10-2 to 10-n are erased to complete the process of selection of the new version.

Figure 7:
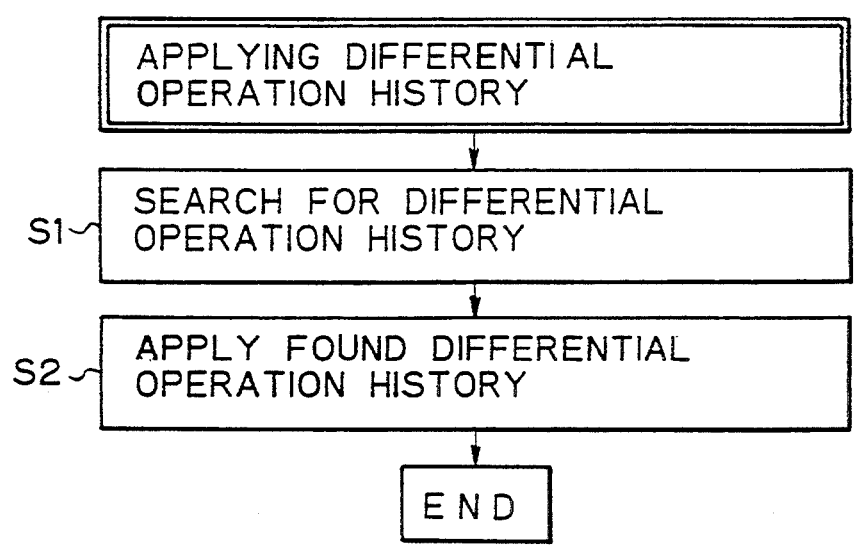
FIG. 7 is a flowchart showing an editing process using a difference between two windows, in the first embodiment, FIGS. 8A and 8B re explanatory illustrations showing the manner of generation of the initial window.

FIG. 7 is a flowchart showing a process for performing version editing for the new window using the differential operation history of the already generated two windows. The shown flowchart illustrates an example of an editing process for the window W6 of FIGS. 13A and 13B, which is derived from the parent window W2 using the differential operation history from the window W3 to the window W5.

Figures 13A, 13B:
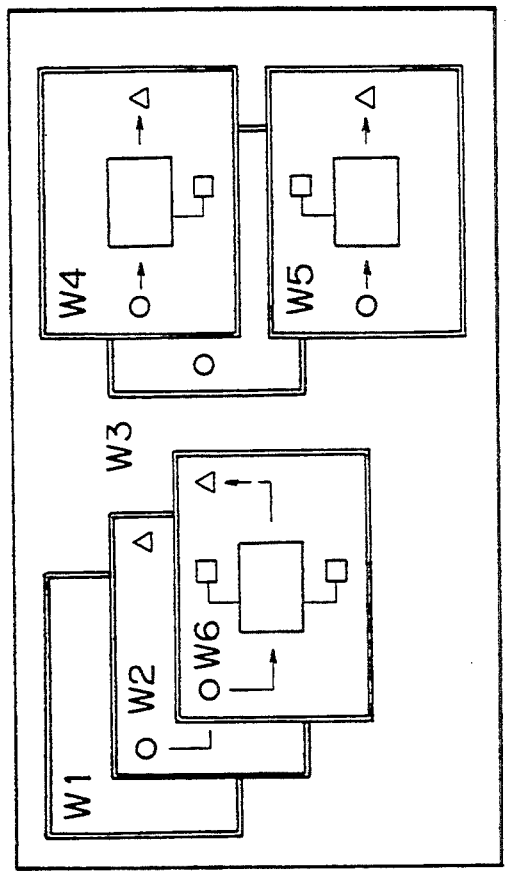
FIGS. 13A and 13B are explanatory illustrations showing the manner of the editing process using differential operation history between versions, in the present invention.

Namely, in the example of FIG. 13A, in addition to the windows W1 to W5 in the examples up to FIG. 11A, the new window W6 is derived from the window W2. As an editing process for the window W6, as shown in a step S1 of FIG. 7, on the operation history management table 12, the differential operation history d from the window W3 to the window W5 is searched. At a step S2, by adding the differential operation history "d" thus obtained to the operation history management table 12 as an editing operation for the window W6, generated as a copy of the parent window W2 and editing the buffer corresponding to the window W6 using the differential operation history "d", editing of the window W6 can be performed.

It should be noted that the differential operation history "d" to be searched and used should not be limited to the single differential operation history but can be plural. For example, the differential operation history to be searched and used can be a group of a plurality of differential operation histories, such as those from the window W1 to the window W5.

By applying the differential operation history of the already generated window for an editing process, it becomes unnecessary to repeatedly perform the same editing operation and thus can simplify the editing process for the windows.

FIG. 14 shows the second embodiment of the version management apparatus according to the present invention, in which a buffer is used in common for an editing process for a plurality of versions on a plurality of mutually distinct windows.

Figure 15:
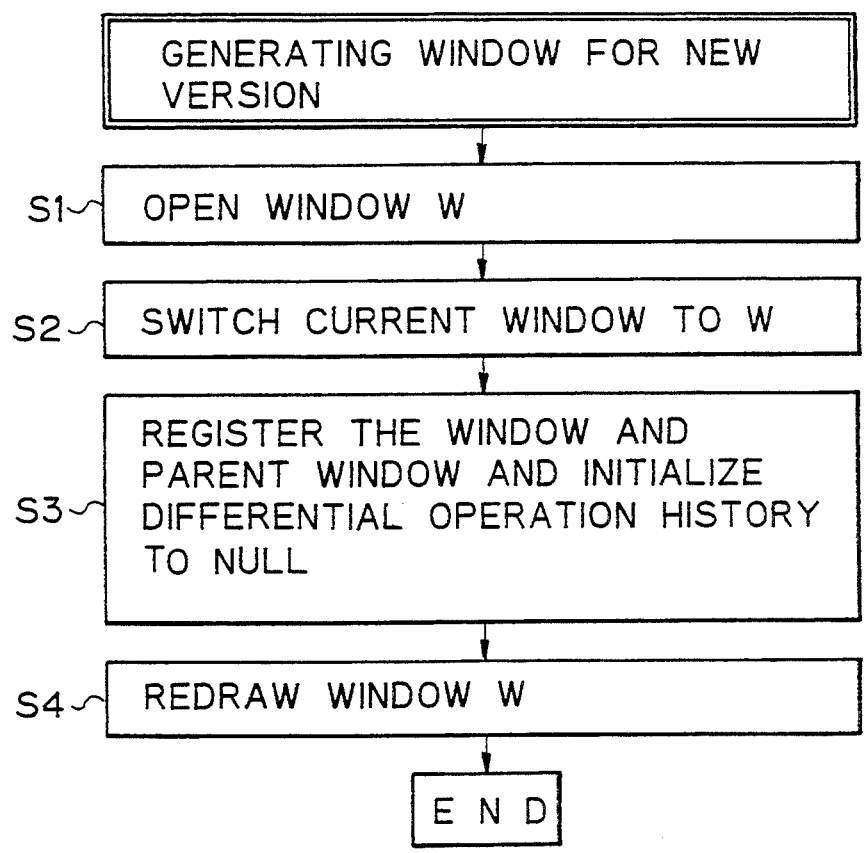
FIG. 15 is a flowchart showing the process of generation of a window in the second embodiment.
Figure 16:
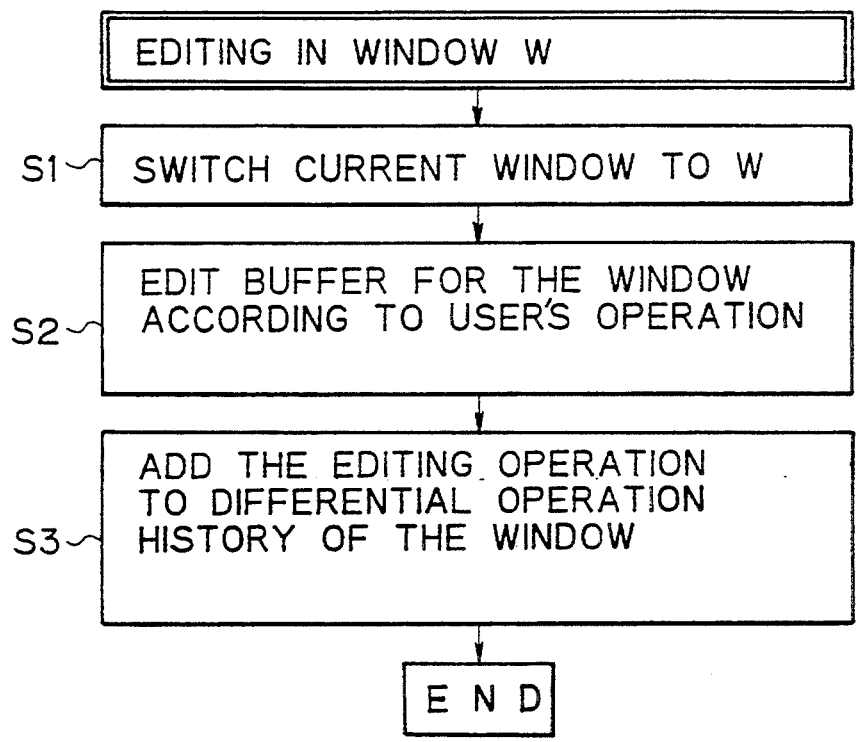
FIG. 16 is a flowchart showing an editing process in the second embodiment.
Figure 17:
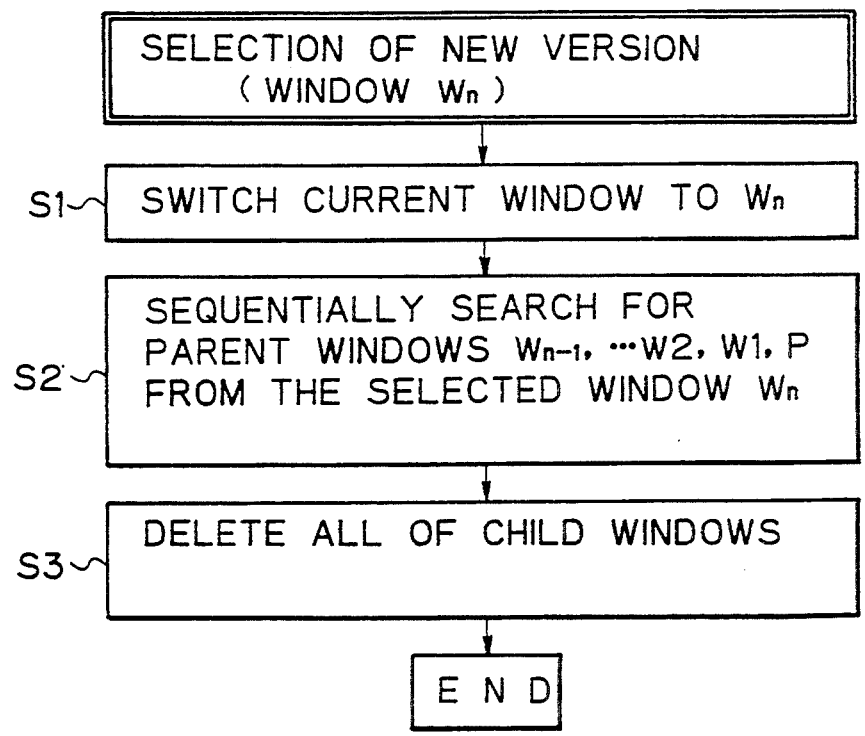
FIG. 17 is a flowchart showing the process of selection of a new version in the second embodiment.
Figure 18:
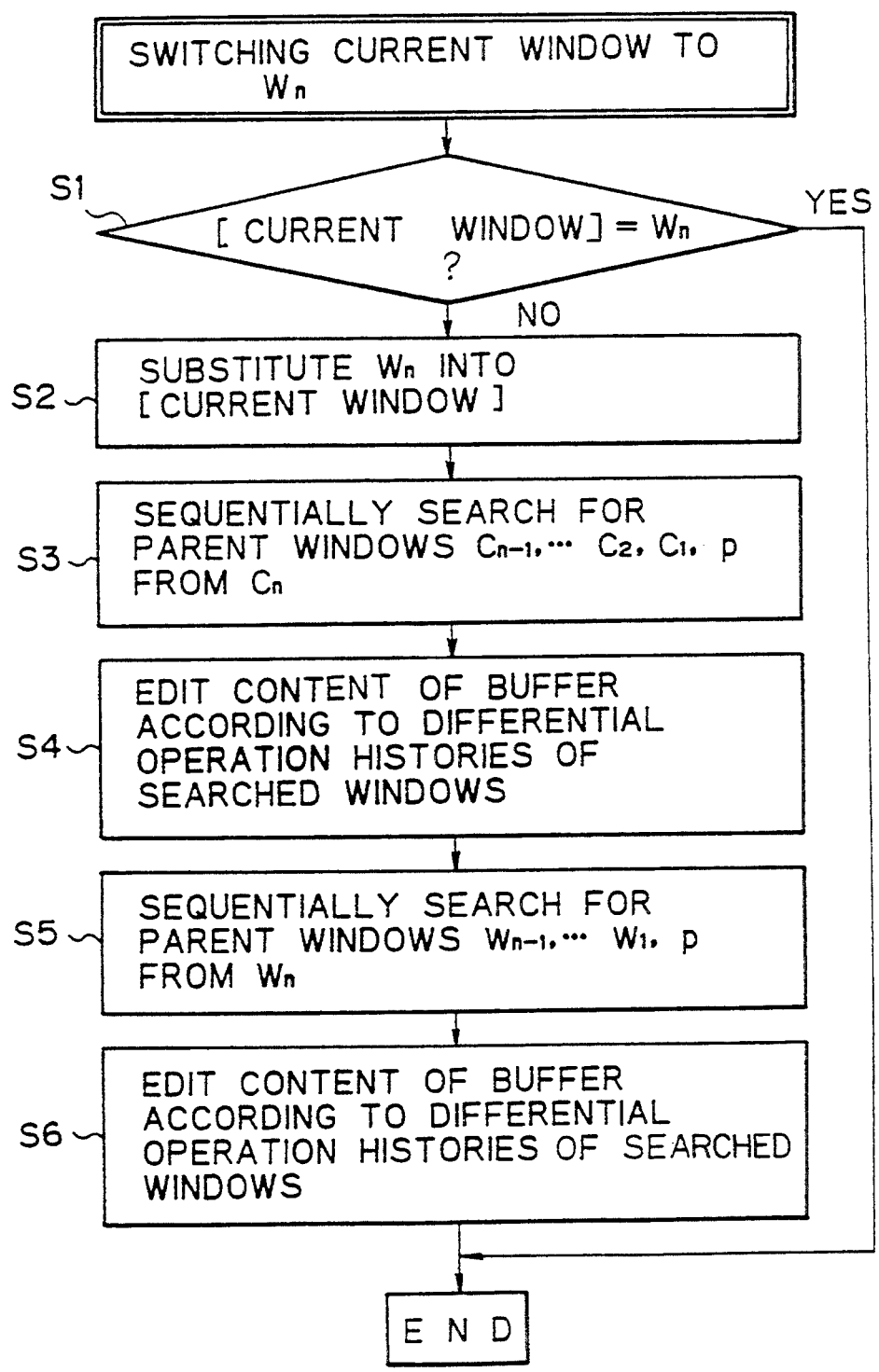
FIG. 18 is a flowchart showing the process of switching the windows in the second embodiment.

In FIG. 14, the construction is substantially the same as that of FIG. 1 except for a single buffer 10 provided in the memory unit 20 for the editing process. By using the single buffer 10 in common with a plurality of windows, the processes for generating the window for a new version, editing of the window and selection of window for the new version, performed by the version editor management unit 14 including the editor module 22 and the version management module 24, becomes as shown in FIGS. 15, 16 and 17, which are different from those of the foregoing first embodiment. Furthermore, in the first embodiment of the present invention, switching of a target window for editing is immediately performed because each window has a corresponding buffer for editing. On the other hand, in the second embodiment of the present invention, a switching process as shown in FIG. 18 is required for switching the target window for editing. The editing operation using the differential operation history described with reference to FIG. 7 can also be performed similarly in the second embodiment of the present invention.

FIG. 15 is a flowchart showing the process for generating the window for a new version in the second embodiment of the version management apparatus of FIG. 14.

In FIG. 15, generation of the window for the new version is initiated by opening the window W on the display 16 by the window management module 18, at a step S1. Then, at a step S2, contents of "current window" which points to the target window is changed to a pointer pointing to the newly generated window, and data stored in the buffer 10 is not changed. Subsequently, at a step S3, on the operation history management table 12, the newly generated window W and the parent window thereof are registered, and the differential operation history is set to NULL representing no content as the initial data. Finally, the newly generated window W, content of which is stored in the buffer 10, is redrawn in the window opened on the display 16.

The window W thus generated through the process of FIG. 15 has the contents of display and the operation history management table 12 similar to those of the first embodiment and thus to those illustrated in FIGS. 8A and 9A.

FIG. 16 shows a flowchart showing an editing process for the window W generated through the process of FIG. 15.

In FIG. 16, at a step S1, the contents of "current window" is changed so as to point the window W and the contents of the buffer 10 is changed to that of the window W according to a switching process shown in FIG. 18. The switching process is described in detail later.

Subsequently, an editing process for the window that is identified as the subject for an editing operation, i.e. editing of the content of the buffer 10 is performed according to the user's operations, at a step S2. For example, when the editing operation for adding ∘, □ and Δ as shown in the windows W2 or W3 of FIG. 10A is performed, editing of the window content in the buffer 10 is performed corresponding thereto. After completion of the editing operation, the process is advanced to a step S3 to add the editing operation performed at the step S2 for the differential operation history of the window which is the subject of the editing. For example, with respect to the editing for the windows W2 and W3 of FIG. 10A, the editing operation shown in the differential operation history of the windows W2 and W3 of the operation history management table 12 is added.

FIG. 17 is a flowchart showing a process for selecting the specific window as a new version in a condition where a plurality of windows are generated with respect to new versions through the processes of FIGS. 15 and 16.

In FIG. 17, it is assumed that the new minor versions W1 to Wn are generated from a major version P and the window Wn is selected as a new major version. Then, at a step S1, the switching process of FIG. 18 (discussed in detail later) is performed so that the "current window" points to the window Wn. Then, at a step S2, using the operation history management table, the parent windows Wn-1, . . . W2, W1, P are obtained in order, from the window Wn. Thereafter, the process is advanced to a step S3 for erasing all child windows W1 to Wn of the parent window P from the operation history management table 12 to maintain the only display for the window P and the only register of the window P in the operation history management table 12.

Figure 19:
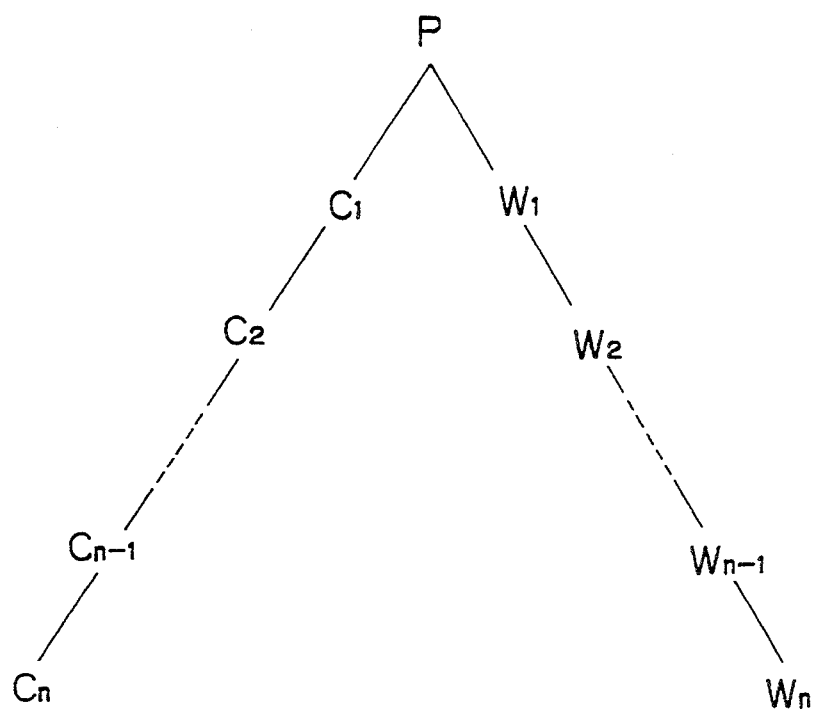
FIG. 19 is an explanatory illustration showing the process for switching the current window Cn to Wn through the process of FIG. 18.

FIG. 18 is a flowchart showing a process for switching the current window. The process is adapted for the situation in which the sequence of the windows W1, W2, . . . Wn are derived with respect to the window P and another sequence of the windows C1, C2, . . . , Cn is also derived with respect to the window P to have a plurality of sequences of derived child windows, as shown in FIG. 19. The following discussion will be given for the example in which the window Wn is selected as a new current window while the window Cn is the current window on the display.

In FIG. 18, at a step S1, a check is performed to determine whether the current window content of which is stored in the buffer 10 is the destination window to be switched. If the identification of the "current window" is different from the destination window, the process is advanced to a step S2. At the step S2, the contents of the "current window" is replaced with that from the window Cn to the window Wn. Then, at a step S3, with respect to the former current window Cn, a sequential search is performed against the operation history management table 12 for obtaining a sequence of the parent windows Cn-1, . . . , C2, C1 and P. At a step S4, based on the differential operation histories of the windows Cn-1, . . . C2, C1 and P, thus obtained, the content of the buffer 10 is updated to the window P.

Subsequently, at a step S5, a sequential search is performed against the operation history management table 12 for obtaining the sequence of the parent windows Wn-1, . . . , W2, W1 with respect to the destination window Wn. Subsequently, at a step S6, using the differential operation histories of the windows W1, W2 . . . Wn, the content of the buffer 10 that corresponds to the content of the window P, is updated and made the content of the window Wn. Then, the switching process to the window Wn is completed.

Though the process in the flowchart of FIG. 18 is for switching the different sequences of the child windows derived from the common ancestor window, when the windows in the same sequence are to be switched, the processes of the steps S3 and S4 of FIG. 18 are performed for switching from the lower window to the upper window, and the steps S5 and S6 of FIG. 18 are performed for switching from the upper window to the lower window.

On the other hand, although the foregoing discussion has been given with respect to generation of the window and editing for graphic data, the same process is, of course applicable for the character data. Also, the shown process is further applicable for an editing process for the composite data of the character, graphic and sign data.

As set forth above, according to the present invention, since the version management can be performed effectively using the multi-window, the efficiency for edition of versions can be remarkably improved. Also, by utilizing the common buffer for a plurality of windows, the required capacity of the buffer can be reduced. Furthermore, by performing editing for the newly derived version utilizing the window operation history between the versions, redundant entry of an identical editing operation can be avoided for facilitating the editing process.

I claim:

1. A version management method for performing management of a plurality of versions of a data file in a multi-window environment, comprising the steps of:
   (a) displaying contents of the versions of the data file in windows on a display screen, the windows including a basic window for a major version and at least one derived window for at least one minor version derived from a parent window;
   (b) retaining an identifier of the parent window and a differential operation history from the parent window with regard to each derived window in an operation history management table, the differential operation history detailing what and how changes were made in contents between the minor version corresponding to each derived window and a parent version corresponding to the parent window; and
   (c) automatically updating corresponding contents of the operation history management table, when a new window for a new version is created as a derivative of one of the windows on the display screen and when an editing operation is performed in one of the windows, to modify the contents of the minor version corresponding thereto.

2. A version management method as claimed in claim 1, further comprising the step of (d) storing the contents of the major and minor versions of the data file in respective buffer memories.

3. A version management method as claimed in claim 2,
   wherein the at least one minor version includes a plurality of minor versions corresponding to a plurality of derived windows, and
   wherein said version management method further comprises the steps of:
   (e) generating from a first window as the parent window a second window as one of the derived windows;
   (f) editing the contents of a first minor version in the second window; and
   (g) replacing the major version with one of the minor versions as a new major version.

4. A version management method as claimed in claim 3, wherein said generating in step (e) comprises the substeps of:
   (e1) opening the second window on the display screen as one of the derived windows;
   (e2) copying the contents of the buffer memory corresponding to the first window to the buffer memory corresponding to the second window;
   (e3) redrawing the contents of the buffer memory in the second window; and
   (e4) storing an identifier of the first window in the operation history management table as the parent window.

5. A version management method as claimed in claim 3, wherein said editing in step (f) comprises the substeps of:
   (f1) editing the contents of the buffer memory corresponding to the second window according to the editing operation; and
   (f2) adding data to the operation history management table representing the editing operation as the differential operation history of the second window.

6. A version management method as claimed in claim 3, wherein said replacing in step (g) comprises the substeps of:
   (g1) selecting a third window to become a new basic window for a new major version from among the derived windows;
   (g2) obtaining a sequence of parent windows of the third window using identifiers of the parent windows in the operation history management table;
   (g3) applying operations corresponding to the differential operation histories of the parent windows and the third window to the buffer memory corresponding to the basic window; and
   (g4) erasing the contents of the operation history management table and the contents of the buffer memories corresponding to all of the derived windows.

7. A version management method as claimed in claim 3, wherein said replacing in step (g) comprises the substeps of:
   (g1) selecting a third window to become a new basic window for a new major version from among the derived windows;
   (g2) copying the contents of the buffer memory corresponding to the third window to the buffer memory corresponding to the basic window; and
   (g3) erasing the contents of the operation history management table and the contents of the buffer memories corresponding to all of the derived windows.

8. A version management method as claimed in claim 3, wherein said editing in step (f) comprises the substeps of:
   (f1) obtaining one of a differential operation history and a sequence of differential operation histories from the first window to the second window;
   (f2) applying operations corresponding to the one the differential operation history and the differential operation histories obtained in step (f1) to the buffer memory corresponding to a third window; and
   (f3) adding the one of the differential operation history and the differential operation histories to obtain the operation history management table corresponding to said editing displayed in the third window.

9. A version management method as claimed in claim 1, further comprising the steps of:
   (d) retaining the contents of one of the versions in a buffer memory; and
   (e) retaining an identifier of a corresponding window for the one of the versions in a current window memory, to define the corresponding window as a current window.

10. A version management method as claimed in claim 9, wherein the at least one minor version includes a plurality of minor versions corresponding to a plurality of derived windows, and wherein said version management method further comprises the steps of:

(f) generating from a first window as the parent window a second window as one of the derived windows;

(g) editing the contents of one of the minor versions in the second window; and (h) replacing the major version with the one of the minor versions as a new major version.

11. A version management method as claimed in claim 10, wherein said generating in step (f) comprises the substeps of:

(f1) opening the second window on the display screen as one of the derived windows;

(f2) storing an identifier of the second window in the current window memory;

(f3) storing an identifier of the first window in the operation history management table; and (f4) redrawing the contents of the buffer memory in the second window.

12. A version management method as claimed in claim 10, wherein said editing in step (g) comprises the substeps of:

(g1) switching the current window to the second window corresponding to the one of the minor versions, by storing the identifier of the second window in the current window memory, and by modifying the contents of the buffer memory to that of the second window using the operation history management table;

(g2) editing the contents of the buffer memory according to editing operations of the second window; and (g3) adding data representing the editing operation of the second window as the differential operation history of the one of the minor versions.

13. A version management method as claimed in claim 10, wherein said replacing in step (h) comprises the substeps of:

(h1) selecting a third window, as a new basic window for a new major version, from among the derived windows;

(h2) switching the current window to the third window by storing the identifier of the third window in the current window memory, and by modifying the contents of the buffer memory to correspond to the third window using the operation history management table;

(h3) obtaining a sequence of parent windows of the third window using the identifiers of the parent windows in the operation history management table; and (h4) erasing the contents of the operation history management table and the contents of the buffer memories corresponding to all of the derived windows.

14. A version management method as claimed in claim 10, wherein said editing in step (g) comprises the substeps of:

(g1) obtaining one of a differential operation history and a sequence of differential operation histories from the first window to the second window;

(g2) applying operations corresponding to the one of the differential operation history and the obtained differential operation histories obtained in step (g1) to the buffer memory; and (g3) adding the one of the differential operation history and the differential operation histories to obtain the operation history management table corresponding to said editing displayed in the current window.

15. A version management apparatus for managing a plurality of versions of a data file in a multi-window environment, comprising:

a display screen;

means for displaying contents of the versions of the data file in windows on said display screen, the windows including a basic window for a major version and at least one derived window for at least one minor version derived from a parent window;

operation history management table means for retaining an identifier of the parent window and a differential operation history from the parent window with regard to each derived window, the differential operation history detailing what and how changes were made in contents between the minor version corresponding to each derived window and a parent version corresponding to the parent window; and means for automatically updating corresponding contents of said operation history management table means, when a new window for a new version is created as a derivative of one of the windows on said display screen by an editing operation performed in one of the windows, to modify the contents of the minor version corresponding thereto.

16. A version management apparatus as claimed in claim 15, further comprising buffer memories to store the contents of the major and minor versions of the data file.

17. A version management apparatus as claimed in claim 16, wherein the at least one minor version includes a plurality of minor versions corresponding to a plurality of derived windows, and wherein said version management apparatus further comprises:

means for generating a child window as a derived window having a parent window;

means for editing the contents of the version in the child window; and means for replacing the major version with one of the minor versions as a new major version.

18. A version management apparatus as claimed in claim 17, wherein said buffer memories include first and second buffer memories, and wherein said generating means comprises:

means for opening a new window on the display screen as one of the derived windows;

means for copying the contents of the first buffer memory, corresponding to one of the windows previously defined as the parent Window, to the second buffer memory corresponding to the new window;

means for redrawing the contents of the first buffer memory in the new window; and means for storing an identifier of the parent window in said operation history management table means.

19. A version management apparatus as claimed in claim 17, wherein said editing means comprises:

means for editing the contents of the second buffer memory corresponding to the new window according to the editing operation; and means for adding data to said operation history management table means representing the editing operation as the differential operation history of the new window.

20. A version management apparatus as claimed in claim 17, wherein said replacing means comprises:

means for selecting one of the derived windows as a new basic window for a new major version;

means for obtaining a sequence of parent windows of the new basic window using the identifiers of the parent windows in said operation history management table means;

means for applying operations corresponding to the differential operation histories of the parent windows and the new basic window to a corresponding buffer memory corresponding to the basic window; and means for erasing the contents of said operation history management table means and the contents of said buffer memories corresponding to all of the derived windows.

21. A version management apparatus as claimed in claim 17, wherein said replacing means comprises:

means for selecting one of the derived windows as a new basic window for a new major version;

means for copying the contents of a corresponding buffer memory corresponding to the new basic window to the buffer memory corresponding to the basic window; and means for erasing the contents of said operation history management table means and the contents of said buffer memories corresponding to all of the derived windows.

22. A version management apparatus as claimed in claim 17, wherein said editing means comprises:

means for obtaining one of a differential operation history and a sequence of differential operation histories from a first window to a second window;

means for applying operations corresponding to the one of the differential operation history and the differential operation histories to a corresponding buffer memory corresponding to a third window; and means for adding the one of the differential operation history and the differential operation histories to obtain the contents of said operation history management table means corresponding to the third window.

23. A version management apparatus as claimed in claim 15, further comprising:

a buffer memory for retaining the contents of one of the versions; and a current window memory for retaining an identifier of a corresponding window corresponding to the one of the windows to provide identification of a current window.

24. A version management apparatus as claimed in claim 23, wherein the at least one minor version includes a plurality of minor versions corresponding to a plurality of derived windows, and wherein said version management apparatus further comprises:

means for generating from a first window as the parent window a second window as one of the derived windows;

means for editing the contents of one of the minor versions in the second window; and means for replacing the major version with the one of the minor versions as a new major version.

25. A version management apparatus as claimed in claim 24, wherein said generating means comprises:

means for opening the second window on said display screen as one of the derived windows;

means for storing an identifier of the second window in said current window memory;

means for storing an identifier of the first window in said operation history management table means; and means for redrawing the contents of said buffer memory corresponding to the first window in the second window.

26. A version management apparatus as claimed in claim 24, wherein said editing means comprises:

means for switching the current window to the second window corresponding to the one of the minor versions, by storing the identifier of the second window in said current window memory, and by modifying the contents of a corresponding buffer memory of the second window using said operation history management table means;

means for editing the contents of said buffer memory according to the editing operation; and means for adding data representing the editing operation as the differential operation history of the one of the minor versions.

27. A version management apparatus as claimed in claim 24, wherein said replacing means comprises:

means for selecting a third window, as a new basic window for a new major version, from among the derived windows;

means for switching the current window to the third window, by storing the identifier of the third window in said current window memory, and by modifying the contents of a corresponding buffer memory of the third window using said operation history management table means;

means for obtaining a sequence of parent windows of the third window using the identifiers of the parent windows in said operation history management table means; and means for erasing the contents of said operation history management table means and the contents of said buffer memories corresponding to all of the derived windows.

28. A version management apparatus as claimed in claim 24, wherein said editing means comprises:

means for obtaining one of a differential operation history and a sequence of differential operation histories from the first window to the second window;

means for applying operations corresponding to the one of the differential operation history and the differential operation histories obtained by said obtaining means to said buffer memories; and means for adding the one of the differential operation history and the differential operation histories to said operation history management table means corresponding to the editing displayed in the current window.

* * * * *